UNITED STATES PATENT OFFICE.

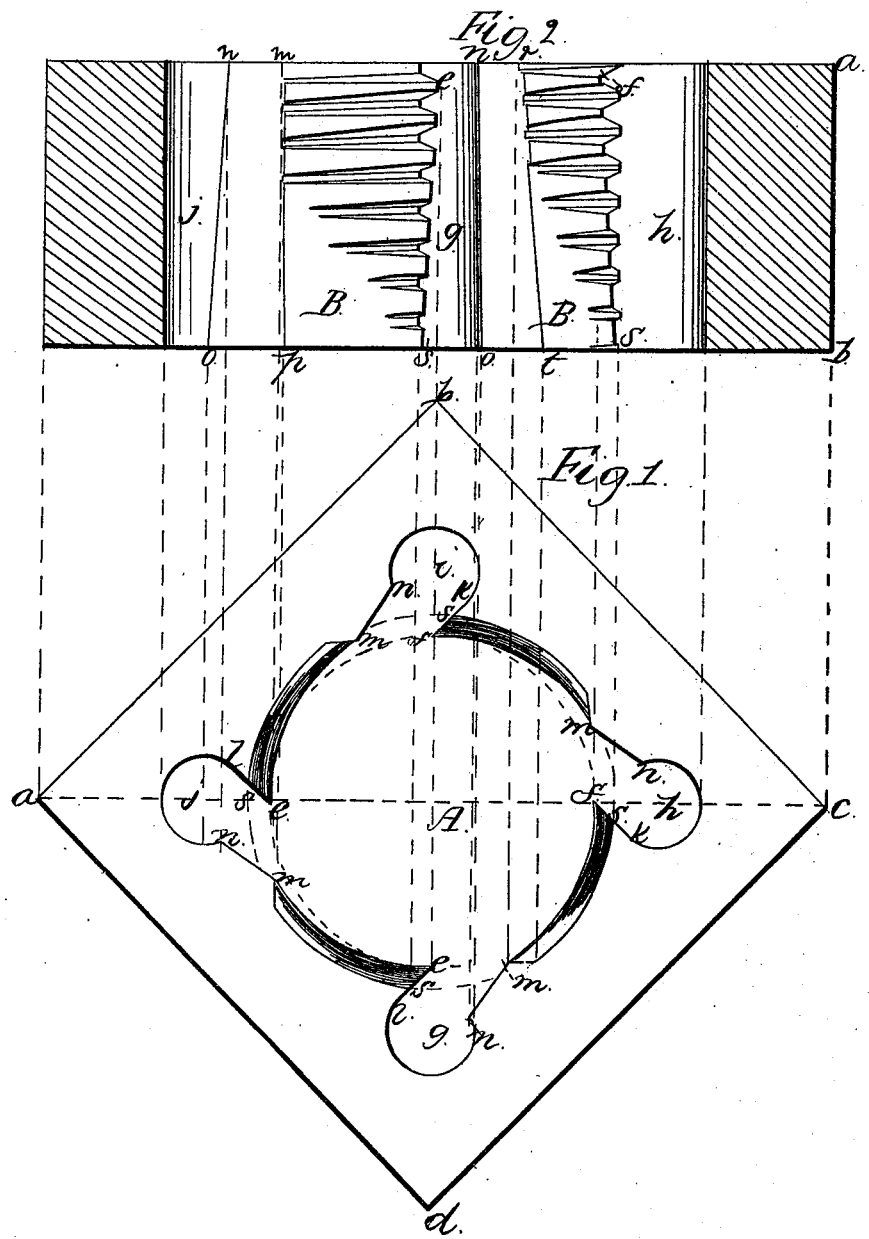

PHILETUS W. GATES, OF CHICAGO, ILLINOIS.

DIE FOR CUTTING SCREWS.

Specification of Letters Patent No. 5,103, dated May 8, 1847.

*To all whom it may concern:*

Be it known that I, PHILETUS W. GATES, of the city of Chicago, in the county of Cook and State of Illinois, have invented a new and Improved Mode of Constructing Dies for the Purpose of Cutting Screws upon Iron and other Metals; and I do hereby declare that the following is a full and exact description thereof.

The object of this improvement is to construct a die in such a manner as that it shall be capable of cutting a full and perfect thread, whether square, or with the sides meeting in an angular edge, at one operation, without the application of more power than is usually expended in each cut of the ordinary dies, which have to be passed several times along the cylindrical piece on which the thread is to be formed.

My die is to be made in one piece of cast steel, and usually in the form of a rectangular block, of such diameter as may be necessary, according to the size of the screw to be cut, and of such thickness as may be required by the number of threads that should be formed within it; in most cases it may contain from six to eight threads, but in general six will be found sufficient. Within the hole made through this die for that purpose, a screw is to be cut, in the latter, or by means of a screw tap. I then proceed to drill two, four, or any preferred number of small holes from one face to the other of the die, their axes coinciding with that of the axis of the large hole constituting the cutting part of the die; these holes are to form a portion of the throat for the receiving and escape of the chips that are to be cut off by the die; they may be from one fourth to three-fourths of an inch in diameter, more or less, according to the size of the die; supposing the die to be square, they should be drilled toward the angular corners of the block, and their sides should just touch, or be in close contact with, the larger diameter of the thread of the screw cut in the die. The portion of the die between these holes and the large hole with cutting threads are to be filed away in a manner to be presently described.

If the threads have been cut up in the lathe, a portion of them may be turned off in such manner as to leave one or two of the threads that are toward the upper face of the die perfect, but so as that the remaining part shall form a hollow cone the diameter of which on the opposite, or lower, face of the die will just obliterate the termination of the last thread; this lower end will then admit the end of the cylindrical piece on which a screw is to be cut; if the screw has been cut by means of a tap, the threads may be reduced by a file. The large hole containing the respective threads will thus increase in diameter, in passing from the upper to the lower face of the dies, and these threads are each to be formed into acute cutting edges, each of which will take off a shaving from the cylindrical piece, instead of in part bruising it into the form of a thread, or merely scraping a portion away, as is ordinarily done. The parts of the threads not concerned in the cutting are to be further removed by filing, as will be presently shown.

In the accompanying drawing Figure 1, represents the upper face of one of my improved dies for cutting screws, and Fig. 2, is a vertical section of a similar die made diagonally, in the line $a$, $c$, of Fig. 1. A, is the large opening through the die, on which the screw is cut, and $g$, $h$, $i$, $j$, the smaller holes that are drilled through for forming a part of the throat for the escape of the chips, or cuttings; of these I have shown four, this being the number that I prefer in most cases, but two may answer the purpose. To form the cutting edges of the threads, I, with a file, or other suitable instrument, cut through the threads of the screw, in the direction of the lines $e$, $l$, $e$, $l$, and $f$ $k$, $f$ $k$, so as to form the acute cutting points or edges $e$, $e$, and $f$, $f$. The openings into the holes $g$, $h$, $i$, $j$, I then enlarge by cutting away the intervening metal say as far as the lines $m$, $n$, $m$, $n$, thus forming two planes between the large hole and each of the small ones from one face of the die to the other. By means of a half round or convex faced file, I then remove a large portion of the threads immediately back of the cutting edges, and thereby form the curves $e$, $m$, $e$, $m$, and $f$, $m$, $f$, $m$, which relieves the die from their friction, as the cutting is effected. This reduction is distinctly shown in Fig. 2, where at the lower part of the die the plane, or unthreaded surfaces B, B, are formed by the filing away, and by the diminished elevation of the cutting points. Should the cutting points become dull they may be sharpened by filing away a portion of the planes formed through the dies in the direction of the lines $f\ k$ and $e\ l$.

When the die is constructed in the manner above described, it is manifest that the size of the screws cut by it will all be invariably of one size; but, if desired, it may be so formed as to cut cylinders varying in diameter to a certain extent, and I have actually so made it. In this case the cutting parts, having the threads on them, must be in separate pieces from the body of the die, and be capable of being regulated in place by means of wedges or set screws; but in this case the construction and operation are the same in other respects with that herein made known, the entire thread being cut by the once passing of the die over the cylindrical piece which is to be operated on, all the cutting parts of the die being immovable for each screw that is cut.

The action of the cutting edges of my dies is somewhat similar to that of the chasing tool in cutting screws in the lathe, as they remove a shaving by means of an acute cutting edge, but they differ materially therefrom in there not being a repeated passing of the tool along the piece in order to complete the thread; and in this particular also they differ from all the instruments previously made by which screws were to be cut on metal by sharp cutting edges, or points.

Having thus fully described the manner in which I construct my dies for the cutting of screws upon metal, and shown the manner in which the same operates, what I claim therein as new, and desire to secure by Letters Patent, is—

The forming of such dies of one solid block, in such manner as that they shall cut a perfect screw by the once passing of it along the piece to be cut; this being effected in the manner set forth that is to say, by the forming of acute cutting edges on the threads within the die, which threads are to be regularly reduced in height from the upper to the lower face thereof at which part the last terminating thread is obliterated, and by the filing away of a large portion of the threads as shown at B, B, and by the curves $e$, $m$, and $f$, $m$, the cutting edges being also furnished with throats for the escape of the cuttings as herein made known and represented, and the whole apparatus being arranged, combined, and operating substantially in the manner and for the purpose set forth.

PHILETUS W. GATES.

Witnesses:
L. D. HOARD,
A. N. TUTTLE.